United States Patent

[11] 3,570,796

[72] Inventor Doc R. Capps
    South Bend, Ind.
[21] Appl. No. 793,366
[22] Filed Jan. 23, 1969
[45] Patented Mar. 16, 1971
[73] Assignee South Bend Tool & Die Co., Inc.
    South Bend, Ind.
    Continuation-in-part of application Ser. No.
    603,697, Nov. 14, 1966.

[54] INDICATOR-MEASURING DEVICE
    5 Claims, 4 Drawing Figs.
[52] U.S. Cl. .................................................. 248/125,
    33/172, 248/221, 248/230, 248/296
[51] Int. Cl. .................................................. G01b 3/22
[50] Field of Search ......................................... 248/125,
    221, 230, (Indicator Mount Digest), 296, 245,
    124, 295; 287/52.08; 180/125; 308/4, 121;
    33/172, 171

[56] References Cited
    UNITED STATES PATENTS
    519,703  5/1894  Ekman ........................ 33/171
    3,253,665  5/1966  Schienle ...................... 180/125x
    FOREIGN PATENTS
    1,273,844  9/1961  France Primary Examiner—Edward C. Allen
Assistant Examiner—Frank Domotor
Attorney—Parker, Carter & Markey ABSTRACT: A gauge stand having predetermined paralleling and angularly related surfaces of controlled dimensions with an indicator-carrying sleeve manually slidable and rotatable but frictionally held in the position placed on a central post, and fluid pressure means facilitating manual movement of the device of the invention.

PATENTED MAR 16 1971
3,570,796
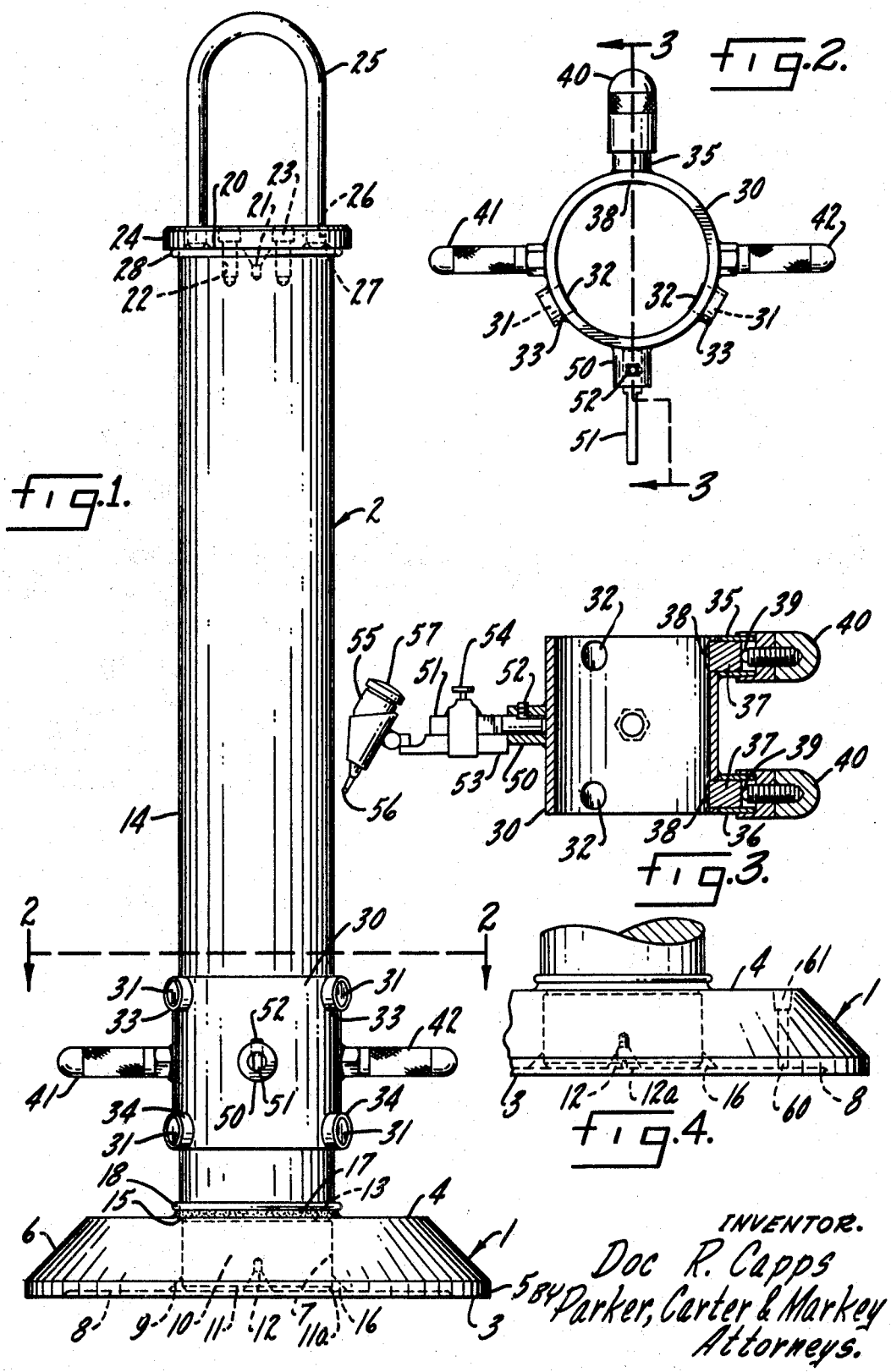
INVENTOR.
Doc R. Capps
Parker, Carter & Markey
Attorneys.

INDICATOR-MEASURING DEVICE

This application is a continuation-in-part of application, Ser. No. 603,697, filed Nov. 14, 1966, and entitled "Indicator-Measuring Device."

SUMMARY OF THE INVENTION

A gauge stand having a relatively massive circular base with measured perpendicular bottom and sidewalls, a central upstanding post having a substantial diameter but less than the base and having a cylindrical wall paralleling the cylindrical wall of the base, the base and post being coaxial. A sleeve is slidable and rotatable on the post and carries extending therefrom an indicator. Circumferentially spaced friction elements engage the cylindrical post wall at opposite ends of the sleeve, some of said friction elements being adjustable toward and away from the post wall, whereby the sleeve may be moved manually along and about the post, yet remain where placed. The base has a central recess and means for supplying fluid pressure thereto for reaction against the force of gravity and to facilitate manual movement of the entire device.

This invention relates to indicator-measuring devices and has devices and has particular relation to right-angle measuring devices.

One purpose of the invention is to provide a means for determining minute variances in the surface of a workpiece.

Another purpose is to provide manually operable means for determining a surface level at any point upon an elongated surface.

Another purpose is to provide a right-angle gauge stand having manually operable means for moving a gauge indicator therealong.

Another purpose is to provide a right-angle gauge stand having manually operable means for rotating an indicator thereabout.

Another purpose is to provide a portable right-angle gauge stand.

Another purpose is to provide a right-angle gauge stand effective to determine the surface measurement of a workpiece spaced from said stand.

In the past the continuance of a desired surface or measurement has been routinely determined by the employment of fixed angles and portable, hand-held squares. In both instances a predetermined level or straight surface has been placed in contact with the surface to be measured on the workpiece. In the first instance the workpiece is brought to the fixed angle. In the latter case the square may be brought to the workpiece. Achieving direct contact of the known surface of these prior angles and squares with the surface to be measured has often proved cumbersome and time consuming.

Accordingly, it is one purpose of the invention to provide a right-angle measuring device having a known surface which need not be placed in direct contact with the workpiece to be measured.

Another purpose is to provide a right-angle gauge stand having means facilitating the refinishing of a surface thereof.

Another purpose is to provide a gauge stand having concentric spaced parallel surfaces thereon.

Another purpose is to provide a right-angle gauge stand having a manually movable element in frictional engagement therewith.

Another purpose is to provide a right-angle gauge stand having a movable element adjustable thereon.

Another purpose is to provide a right-angle gauge stand having an element movable thereon and adjustable friction means for adjusting the friction between said element and said stand.

Another purpose is to provide a gauge stand having means for determining a surface remote from said stand.

Another purpose is to provide a gauge stand having means facilitating the movement thereof.

Other purposes will appear from time to time during the course of the specification and claims.

BRIEF DESCRIPTION OF THE DRAWINGS

The invention is illustrated more or less diagrammatically in the accompanying drawings wherein:

FIG. 1 is a side elevation;

FIG. 2 is a sectional view with the post omitted taken on a line 2—2 of FIG. 1;

FIG. 3 is a sectional view taken on a line 3—3 in FIG. 2; and

FIG. 4 is a detail view illustrating the gauge stand moving means.

Like parts are indicated by like numerals throughout the specification and drawings.

DESCRIPTION OF THE PREFERRED EMBODIMENT

Referring now to the drawings, the numeral 1 generally designates a base. Upstanding centrally of and concentrically with the base 1 is a post indicated generally by the numeral 2. While the parts are shown in FIG. 1 with the base 1 lowermost and the post 2 upstanding thereon, it will be realized that the structure of the invention may be employed in a variety of positions without departing from the nature and scope of the invention. For convenience and clarity, however, the parts will be described in their relationship as shown in FIG. 1.

The base 1 has an annular, peripheral, flat surface 3. The surface 3 is parallel with the upper surface 4 of base 1. A circumferential wall surface 5 rises from the peripheral edge of surface 3 and is normal thereto. A conical surface 6 joins surfaces 5 and 4. The base 1 is centrally apertured as indicated at 7. The flat, annular bottom surface 3 surrounds a central recess 8 in the bottom of base 1. The recess 8 is further conically recessed as indicated at 9 adjacent the aperture 7.

A ring fit is achieved between the central aperture or bore 7 in the base 1 and a reduced end portion 10 of post 2. The lower end surface 11 of post 2 has a chamfered periphery as indicated at 11a. An axial socket 12 is formed in the end portion 10 and penetrates the end surface 11. It will be observed that the end surface 11 lies in the plane of the base wall of recess 8.

A circumferential groove or undercut 13 is formed between the main cylindrical gauge surface 14 of post 2 and the end portion 10 thereof. It will be observed that the groove 13 divides the end portion 10 and the gauge surface or gauge portion 14 of the post 2 and that the groove 13 is received just within the bore 7 of base 1. A shoulder 15 is created by the greater diameter of surface 14 of post 2 over that of the portion 10 of post 2. The annular surface of shoulder 15 is normal to the surface 14 and the shoulder 15 rests on surface 4 of base 1 to insure the perpendicular relationship of surface 14 to parallel surfaces 4 and 3 and to insure parallelism between surfaces 14 and 5.

The opening created by recess 9 and chamfered surface 11a is filled by a weldment indicated at 16. Similarly, the surface 4 and the lower edge of surface 14 adjacent the shoulder 15 may be secured by a second weldment 17. A flexible bumper, which may, for example, take the form of a conventional O-ring 18, surrounds the post 2 adjacent surface 4 and weldment 17.

The opposite end of post 2 from the portion 10 has an end surface 20 broken by a an axial socket 21 corresponding generally to the socket 12. A plurality of circumferentially spaced, inwardly threaded wells 22 also penetrate the end surface 20 of post 2 for reception of fasteners 23 which in turn secure an end plate 24 to the surface 20. Upstanding from and secured to the plate 24 is an inverted U-shaped handle member 25. The handle member 25 may be conveniently secured to the plate 24 by inserting the end portions of the legs thereof in apertures 26 extending through the plate 24, the weldments 27 filling annular conical recesses formed by a lower conical enlargement of the bores 26 and the chamfered end surface of the legs of handle 25. A second buffer member, such as the O-ring 28 surrounds the post 2 adjacent the undersurface of end plate 24.

Slidable on post 2 is a sleeve 30. The sleeve 30 has an inner diameter slightly greater than the outer diameter of post 2, there being a difference of the order of 0.006 inches. Equispaced circumferentially about the sleeve 30 is a plurality of friction elements arranged in two rows adjacent the upper and lower edges of sleeve 30. As may be best seen in FIG. 2, for example, the friction elements of each row are shown as three in number, each spaced 120° from the other two.

Two of each set of three friction elements are, as indicated at 31, formed of suitable friction-creating material, such as Micarta or the like, and take the form of a cylindrical surface 14 of post 2. Two elements 31 are fixedly received in bosses or retainers 33 secured to and extending radially from sleeve 30. An identical set of friction elements 31 are similarly received in fixed retainers 34, the retainers 34 being vertically aligned and identical with the retainers 33. It will be observed that the friction elements 31, press-fitted or otherwise held rigidly in retainers 33 and 34, extend inwardly of the sleeve 30 for contact with the surface 14 of post 2.

Spaced 120° from either retainer 33 is an elongated retainer sleeve or boss 35 and vertically aligned beneath the retainer boss 35 is an identical retainer boss 36. Slidable in the bosses 35, 36 are friction elements 37. The elements 37 correspond substantially to the elements 31, although the elements 37 may be somewhat longer in length. The elements 37, like the elements 31, have a concave forward surface 38 extending inwardly of sleeve 30 for contact with the surface 14 of post 2. Adjustment means engage the elements 37, as indicated at 39, and knurled closures 40 are threaded on bosses 35, 36. Adjustment of elements 37 within sleeves 35, 36, and resulting adjustment of the frictional engagement of elements 37 and 31, is achieved by varying the force at 39.

Extending in opposite directions from diametrically opposed points on the sleeve 30 are manually operable handle elements 41, 42. It has been found convenient to position the handle elements at 90° on sleeve 30 from the members 40.

Diametrically opposed to the members 40 and substantially centrally positioned between the upper and lower edges of the sleeve 30 is an indicator support socket 50. The socket 50, as may be best seen in FIG. 3, receives an indicator support rod 51 held in socket 50 by lock means 52. As shown in FIG. 3, the rod 51, which may be of any suitable extension, slidably receives an indicator support 53 which in turn carries lock means 54 for engagement with the rod 51. The distal end of support 53 carries a suitable indicator member 55 which in turn has a sensitive finger element 56 for engagement with the surface to be measured or determined. Since the indicator member 55 and finger 56 may take a variety of conventional forms, it appears sufficient to set forth that the gauge 55 includes a visual scale seen through a transparent cover, such as that shown at 57. It will be realized that any suitable sensitive indicator may be employed in substitution for that shown at 55 herein and that the same may be supported in a variety of ways on and from the sleeve 30 without departing from the nature and scope of the invention.

Referring now to FIG. 4, it will be observed that the base 1, which, it will be understood, is of substantial mass sufficient to insure against accidental tilting of the gauge stand of the invention, has formed therein and extending from upper surface 4 to the central recess or pocket 8, a through passage 60. At its juncture with surface 4 of base 1, the passage 60 includes a fitting-receiving configuration 61.

It will be realized that the peripheral flat or foot surface 3 rests upon an appropriate flat supporting surface and encloses the circular recess or pocket 8 therewithin. A suitable closure 12a may be positioned in the socket 12.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

In the construction of the device of the invention care is taken to insure the perpendicularity of surfaces 3 and 14 and 3 and 5, as well as the parallelism of surfaces 3 and 4 (below shoulder 15) and 5 and 14 and the concentricity of surfaces 5 and 14. These relationships, for example, are maintained accurate within a tolerance of the order of 0.0005 inches.

The device of the invention and the workpiece having a surface to be measured are brought into a suitably adjacent relationship, the workpiece being brought to the device, or vice versa. Since the finger 56 and gauge 55 may be supported at any desired distance from the sleeve 30, it will be realized that the surface to be measured may, when desired or necessary, be spaced a substantial distance from the gauge surface 14.

The sleeve 30 is then moved, through the mediacy of handles 41, 42, along surface 14 to bring sensing finger 56 into contact with the surface to be measured. The sleeve 30 is also rotated about surface 14 in order to insure contact with the highest or nearmost portion of the surface to be measured. The indicator scale seen through window 57 may be set at zero upon initial contact of finger 56 with the surface to be measured. The sleeve 30 is then suitable moved along the surface 14 to correspondingly move the finger 56 in any desired direction along the surface to be measured and the indicator is observed through the window 57 to detect any variance on the indicator scale therebelow as the finger 56 moves along the surface to be measured.

It has been found convenient to apply a thin film of suitable lubricant, such as vaseline or the like, to the surface 14 to facilitate movement of the sleeve 40 therealong. The engagement of friction elements 31 and 37 is, however, sufficient to retain the sleeve 30 in any position placed on the surface 14, said friction resisting the affect of gravity on the sleeve 30 and the elements carried thereby when the device is employed in the position shown, for example, in FIG. 1.

The employment of upper and lower friction elements 37 and the adjustability of the friction achieved thereby enables the employment of an elongated rod 51 and the spacing of the finger 56 a substantial distance from the sleeve 30 without risk of tilting of the sleeve 30 on post 2.

Should the surface 14 or 5 require treatment, the plate 24 and sleeve 30 are removed, after separation of fasteners 23, and the sockets 12 and 21 are engaged by suitable tool elements of a lathe or the like to facilitate said treatment.

The buffer elements 18 and 28 cushion the sleeve 30 and preclude its contact with the metal of plate 24, base 1 or weldment 17.

The surface 5 is insured normal to the surface 3. On occasion the surface 5 may be placed in contact with a portion of workpiece having a surface to be measured or determined. Since surfaces 5 and 14 are insured concentric, repeated contact of surface 5 with the workpiece will always result in the same spacing of surface 14 from the point of such contact.

It will be realized also that the device of the invention may be placed within various suitable structures for appropriate measurement of inner surfaces of such structures without departing from the nature and scope of the invention.

While the invention may be most frequently employed in the determination of continuous or unbroken surfaces, it will be realized that the same may be employed in measuring a varying surface against a desired relationship, the perpendicularity of surfaces 3 and 14 providing an insured, accurate base for measuring such surface variances against those desired.

The structure of FIG. 4 facilitates the movement of the gauge stand of the invention. It will be understood that the gauge stand may be of substantial height and weight, the base 1 being of sufficient mass to produce a low center of gravity effective against tilting of the structure. Movement of the device of the invention is accomplished by insertion of an appropriate fitting (not shown) carried on the end of an air pressure supply conduit, into the receiving configuration 61 and the supply of fluid pressure through said fitting to passage 60 and recess 8. Air thus supplied under pressure to recess 8 tends to lift the device of the invention, working against the force of gravity and making the device movable with minimum manual effort.

I claim:

1. A tool comprising a circular base having a flat bottom surface, a circumferential wall surface on said base and normal to said base bottom surface, an elongated cylindrical upright fixed on said base, said upright having a circumferential surface normal to said base bottom surface and spaced from and paralleling said base circumferential wall surface, a sleeve slidable and rotatable on said upright, circumferentially spaced friction elements carried by said sleeve and engaging said circumferential surface of said upright, at least one of said friction elements being movable in a direction toward and away from the axis of said upright, and an indicator support carried by said sleeve, said friction elements being at least three in number and equally spaced circumferentially about the axis of said upright and wherein said friction elements are arranged in two rows laterally of said upright, the friction elements of one of said rows being in alignment with the friction elements of the other of said rows, said rows being at opposite ends of said sleeve, and said indicator support extending outwardly from said sleeve at a point intermediate its ends and between said rows.

2. The structure of claim 1 wherein each of said rows include one of said movable friction elements, said movable friction elements being urged inwardly of said sleeve by threaded elements to produce a friction sufficient to overcome the effect of gravity upon said sleeve and indicator support but insufficient to preclude manual movement of said sleeve slidably and rotatably on said upright.

3. The structure of claim 2 characterized by and including handle elements extending radially from said sleeve and wherein said indicator support extends radially from said sleeve at a point 90° from each of said handles and said movable friction elements are movable toward said upright in a direction diametrically aligned with said indicator support.

4. The structure of claim 1 wherein said upright has one of its end surfaces extending through said base and characterized by and including axial sockets formed in the opposite end surfaces of said upright whereby said upright and base may be turned together for resurfacing.

5. The structure of claim 1 characterized by and including a circular recess in the bottom surface of said base and a passage through said base and communicating said recess with atmosphere whereby fluid pressure may be supplied to said recess through said passage to lift said tool.